United States Patent Office 3,006,873
Patented Oct. 31, 1961

3,006,873
RUBBER ARTICLE CONTAINING OIL COATED REFLECTANT PARTICLES AND PROCESS OF MAKING
Merritt A. Taylor, West Haven, Conn., assignor to The Seamless Rubber Company, New Haven, Conn., a corporation of Connecticut
No Drawing. Filed May 16, 1958, Ser. No. 735,677
10 Claims. (Cl. 260—5)

This invention relates to the production of reflectant rubber products and to a process for producing such products.

Prior reflectant rubber products fail to display a bright attractive appearance marked by a uniform colored reflectant sheen, but rather appear dull and have a low reflectance value. In the production of reflectant rubber products it is desirable to have the products exhibit a high reflectance value so as to give them "eye appeal."

Accordingly, one of the objects of the present invention is to provide truly reflectant rubber products having a high reflectance value.

It is also an object to provide metallic colored reflectant rubber stocks which can be calendered, molded or extruded in the conventional manner into a variety of rubber articles without material diminution in the desired reflectance value of the rubber product.

A further object is to provide a novel process for making metallic colored reflectant rubber products.

It has been discovered that reflectant rubber products with unusually high reflectance values can be prepared by having incorporated in the products oil-coated reflectant particles.

Generally the reflectant rubber products of the present invention comprise having incorporated therein rubber reflectant particles coated with oil. According to the use to be made of the reflectant rubber composition, a variety of plasticizers and softeners, accelerators and antioxidants, fillers (including pigments for color) and sulfur are added to the rubber mixture.

The rubber in the composition should be translucent and it is possible to use either ordinary No. 1 pale crepe rubber with or without synthetic rubbers such as GR-S (a synthetic rubber made from the polymerization of butadiene and styrene) as a blend, so that rubber compounds can be obtained which range from the unloaded type (pure gum type) to the highly loaded rubbers, The blends of the natural and synthetic rubber can be varied so as to contain equal proportions of each type of rubber.

The reflectant particles may be of either non-metallic or metallic types. Examples of suitable non-metallic reflectants are addition and condensation polymers such as dyed or surface metallized "Mylar" (polyethylene terephthalate), ground or flakes styrene, cellulose acetate types of films, mica, ground or flaked glass, etc. Some suitable metallic reflectant particles are aluminum, bronze, gold, silver, etc.

While any of the above materials can be used as reflectants, it is preferred to use polished aluminum powder. It is possible to use polished aluminum powders ranging from 40 mesh to 325 mesh, but the most desirable is 100 mesh since it gives by far the highest degree of reflectance.

The oil used to coat the reflectant particles can be either a petroleum oil, such as "Cylene" and white mineral oil, or a vegetable oil such as soybean oil and cottonseed oil.

The amount of reflectant particles and oil present in the reflectant rubber products can be from 3% to 10% of each, based on the weight of the rubber. The use of less than 3% of reflectant particles results in products which lack a uniform glistening metallic sheen, and employing over 10% of oil and reflectant particles makes the rubber soft and unmanageable during processing. The ratio of reflectant particles to oil can also be varied, but it is desirable to have equal parts by weight of each in the reflectant rubber products.

Suitable rubber dyes may be added to color the reflectant rubber products or the dye may be omitted, in which case the reflectant rubber products assume the color of the reflectant particles incorporated therein.

The reflectant rubber products are prepared by combining rubber with the desired plasticizer, softener, accelerator, antioxidant, filler and sulfur. Depending upon the characteristics desired in the end product, the proportions of the ingredients can be varied or, if desired, certain of the ingredients can be eliminated or others added. To this composition is added from 6% to 20% of a paste formed by mixing together the reflectant particles and oil. This composition is thoroughly mixed and processed by either calendering, extruding or molding to form a variety of vulcanized reflectant rubber products having an unexpectedly high reflectance value.

While the exact theory for this unexpectedly high reflectance value is not understood, it is believed that the oil covers the reflectant particles with a thin film of oil and in this way prevents the fine reflectant particles from abrading their surfaces, thus retaining their reflectant power. I have noticed that if the reflectant particles are added to the rubber during mixing without first adding oil to form a paste, the reflectance value of the rubber compounds diminishes as the grinding of the rubber and milling of the compound continues. This would indicate that as the reflectant material is dispersed in the rubber without a protective film of oil, there is a grinding or breaking up process which destroys much of the reflectant particles surface and hence gives a dull product.

Examples of suitable compositions for producing the reflectant rubber products are set forth below as follows:

*Example I*

| Mix A: | Lbs. |
|---|---|
| #1 pale crepe natural rubber | 100 |
| White hydrated silica | 6 |
| Phthalocyanine green color | 3 |
| Tetramethyl thiuram disulfide accelerator | ¼ |
| Zinc benzothiazylsulfide accelerator | 1 |
| Sulfur | 1 |
| 4,4'-dithiomorpholine | 1 |
| Hexamethylenetramine | 1½ |
| Zinc oxide | 1 |
| (Antioxidant) 2,2' - methylene - bis - (4-methyl-6-tertiary-butyl-phenol) | 1 |

| Mix B: | |
|---|---|
| Aluminum powder | 3 |
| White mineral oil | 3 |

In preparing reflectant rubber products from the above composition the rubber was first blended on a two-roll rubber mill and then the other ingredients of mix A were added in the order in which they appear in the formula. The aluminum powder and mineral oil of mix B were stirred together to form a paste and this paste was added as the last ingredient in the formulation. After a thorough mixing which thoroughly dispersed the reflectant material throughout the rubber, the rubber stock was molded to form water bottles. The molded water bottles were cured in five minutes at 70 lbs. steam pressure. The finished products exhibit a uniform bright metallic colored sheen.

*Example II*

The same ingredients were employed as set forth in Example I with the exception that the rubber was composed of a mixture of 75 lbs. of #1 pale crepe rubber and 25 lbs. of GR–S.

A mixed rubber stock using the above formulation was prepared as set forth in Example I and further processed by calendering the rubber stock to form rubber sheets which were then heat cured. The finished sheets had a bright metallic color sheen and a high reflectance value.

*Example III*

|  | Lbs. | Ozs. |
|---|---|---|
| Mix A: |  |  |
| #1 pale crepe natural rubber | 48 |  |
| SBR #1708 [1] synthetic rubber | 15 |  |
| Diorthotolualguanidene accelerator |  | 4 |
| Zinc benzothiazylsulfide accelerator |  | 14 |
| Phthalocyanine green color |  | 8 |
| Sulfur |  | 12 |
| 4,4'-dithiomorpholine |  | 12 |
| Zinc oxide |  | 11 |
| Stearic acid |  | 2 |
| Microcrystalline wax |  | 2 |
| Antioxidant, 2,2'-methylene-bis-(4-methyl-6-tertiary-butyl-phenol) |  | 15 |
| Hydrated silica filler | 6 |  |
| Mix B: |  |  |
| Aluminum powder (100 mesh polished powder) | 3 |  |
| White mineral oil | 3 |  |

[1] SBR #1708 is an oil extended synthetic rubber consisting of 23.5% styrene and 76.5% butadiene copolymerized at 41° F. It contains 37.5 parts of petroleum oil per 100 parts of polymer.

A mixed rubber stock using the above formulation was prepared as set forth in Example I and further processed by extruding the stock into rubber tubes which were then cured. The rubber tubes were opaque and had a uniform metallic reflected sheen with a high degree of reflectance.

In like manner various rubber stocks may also be processed by calendering, extruding and molding into articles such as footballs, rubber gloves, bathing caps, fountain syringes and other rubber products of varying stiffness and elasticity.

In order to illustrate the unexpectedly high degree of reflectance attained by the novel reflectant rubber of the present invention, the following test was made. A sheet of rubber was made by calendering and curing the rubber stock set forth in Example III. A second sheet was made from a composition which differed from that of Example III in that aluminum powder alone was added to the composition, and the oil was eliminated. A third sheet was made with a composition as set forth in Example III with the exception that stearic acid was added in place of the oil. The amount of aluminum powder added in all three cases was identical.

The reflectance value of each of the sheets was taken with a Photo-Volt-Photo Electric Reflection Meter, Model 610. The results were as follows:

Composition: Reflectance value
(1) Aluminum powder and oil paste _____ 42
(2) Aluminum powder alone _____ 26
(3) Aluminum powder and stearic acid _____ 24

For purposes of comparison, a white shiny surface gives a reflectance value of 100. Other sheets of reflectant rubber made by my process gave reflectance values up to 53 and higher, depending upon the rubber composition used. None gave a reflectance value lower than 42.

From the foregoing description, it can be seen that reflectant rubber products, having incorporated therethrough oil-coated reflectant particles, have up to twice the reflectance value of the prior reflectant rubber products. The metallic colored reflectant rubber products are opaque, having a uniform color and a glistening sheen which markedly distinguishes them from all prior reflectant rubber products. Further, the rubber products of my invention can be stretched several times their length and retracted to their original condition without any impairment in the reflectance of the surface at any part of the stretching or retraction.

It is to be understood, as noted above, that changes and variations may be made without departing from the spirit and scope of the invention as defined in the appended claims.

I claim:
1. A reflectant rubber article having a reflectance value greater than 42, comprising a rubber having distributed uniformly therethrough about 5% by weight of 40–325 mesh aluminum powder particles based on the weight of the rubber, said particles being coated with an equal weight of white mineral oil.

2. A reflectant rubber article having a reflectance value greater than 42, comprising a rubber having distributed uniformly therethrough reflectant particles coated with a thin oil film, the oil coated reflectant particles comprising by weight from about 6 to about 20% of the weight of the rubber, the ratio by weight of oil to reflectant particles being from about 3:10 to about 10:3, the weight of reflectant particles being at least about 3% of the weight of the rubber and the weight of oil being less than about 10% of the weight of the rubber.

3. A reflectant rubber article having a reflectance value greater than 42, comprising a rubber having distributed uniformly therethrough reflectant particles coated with a thin oil film, the weight of the reflectant particles being at least about 3% of the weight of the rubber, and the weight of oil being less than about 10% of the weight of the rubber, the ratio by weight of oil to reflectant particles being approximately equal.

4. A reflectant rubber article according to claim 3, wherein said rubber is of the group consisting of pale crepe rubber and mixtures of pale crepe rubber and a polymerized butadiene-styrene copolymer.

5. A reflectant rubber article according to claim 3 wherein said oil is of the group consisting of a vegetable oil and a petroleum oil.

6. A process for the preparation of reflectant rubber articles having a reflectance value greater than 42, comprising the steps of mixing together to form a paste reflectant particles and an oil wherein the ratio by weight of oil to reflectant particles varies from about 3:10 to about 10:3, blending with a rubber from about 6 to about 20% of said paste based on the weight of the rubber, the reflectant particles being at least about 3% by weight of the rubber and the weight of oil being less than about 10% by weight of the rubber, and curing the blended stock.

7. A process for the preparation of reflectant rubber articles having a reflectance value greater than 42, comprising the steps of mixing together to form a paste approximately equal amounts by weight of reflectant particles and an oil, blending said paste with a rubber in an amount from about 6% to about 20% based on the weight of the rubber, and curing the blended stock.

8. A process according to claim 7 wherein said rubber is of the group consisting of pale crepe rubber and mixtures of pale crepe rubber and a polymerized butadiene-styrene copolymer.

9. A process according to claim 7 wherein said oil is of the group consisting of a vegetable oil and a petroleum oil.

10. A process for the preparation of reflectant rubber articles having a reflectance value greater than 42, comprising the steps of mixing together approximately equal amounts by weight of aluminum particles having a particle size of from 40–325 mesh and a white mineral oil to form a paste, blending said paste with pale crepe rubber in an amount of from about 6% to about 20% based on the weight of the rubber, and curing the blended stock.

References Cited in the file of this patent

UNITED STATES PATENTS

| | | |
|---|---|---|
| 1,395,413 | Hoffman et al. | Nov. 1, 1921 |
| 2,050,193 | Park | Aug. 4, 1936 |
| 2,358,290 | Kraft | Sept. 12, 1944 |
| 2,440,299 | Rostler et al. | Apr. 27, 1948 |